United States Patent
Baldiga et al.

(10) Patent No.: US 10,378,387 B2
(45) Date of Patent: Aug. 13, 2019

(54) CMC SHROUD SUPPORT SYSTEM OF A GAS TURBINE

(71) Applicant: General Electric Company, Schenectady, NY (US)

(72) Inventors: Jonathan David Baldiga, Amesbury, MA (US); Jason David Shapiro, Methuen, MA (US)

(73) Assignee: General Electric Company, Schenectady, NY (US)

(*) Notice: Subject to any disclaimer, the term of this patent is extended or adjusted under 35 U.S.C. 154(b) by 86 days.

(21) Appl. No.: 14/891,806

(22) PCT Filed: Apr. 23, 2014

(86) PCT No.: PCT/US2014/035089
§ 371 (c)(1),
(2) Date: Nov. 17, 2015

(87) PCT Pub. No.: WO2014/186099
PCT Pub. Date: Nov. 20, 2014

(65) Prior Publication Data
US 2016/0097303 A1    Apr. 7, 2016

Related U.S. Application Data (60) Provisional application No. 61/824,491, filed on May 17, 2013.

(51) Int. Cl.
*F01D 25/28* (2006.01)
*F01D 11/08* (2006.01)
(Continued)

(52) U.S. Cl.
CPC .............. *F01D 25/28* (2013.01); *F01D 11/08* (2013.01); *F01D 11/12* (2013.01); *F01D 25/246* (2013.01);
(Continued)

(58) Field of Classification Search
CPC .......... F01D 11/08; F01D 11/12; F01D 25/28; F01D 25/246
(Continued)

(56) References Cited

U.S. PATENT DOCUMENTS 3,583,824 A    6/1971   Smuland et al.
3,778,185 A   12/1973   Plowman et al.
(Continued)

FOREIGN PATENT DOCUMENTS

CA    2520792 A1    3/2006
CN    1219215 A     6/1999
(Continued)

OTHER PUBLICATIONS

Unofficial English Translation of Japanese Office Action issued in connection with corresponding JP Application No. 2016513961 dated Nov. 8, 2016.
(Continued)

*Primary Examiner* — Richard A Edgar
*Assistant Examiner* — Michael L Sehn
(74) *Attorney, Agent, or Firm* — General Electric Company; Kristi Davidson (57) ABSTRACT

A shroud support system with load spreading comprises a shroud hanger having a first wall and a second wall spaced apart in an axial direction by a retainer support wall, a ceramic matrix composite shroud segment disposed in the shroud hanger between the first and second walls and the retainer support wall, a retainer having circumferentially spaced first and second bolt holes, the retainer passing through the shroud, first and second bolts passing through the shroud hanger and engaging the first and second bolt holes of the retainer.

20 Claims, 9 Drawing Sheets

(51) Int. Cl.
*F01D 11/12* (2006.01)
*F01D 25/24* (2006.01)

(52) U.S. Cl.
CPC ..... *F05D 2300/6033* (2013.01); *Y02T 50/672* (2013.01)

(58) Field of Classification Search
USPC ..................................................... 415/173.1
See application file for complete search history.

(56) References Cited

U.S. PATENT DOCUMENTS

| | | | |
|---|---|---|---|
| 4,087,199 A * | 5/1978 | Hemsworth | F01D 11/08 415/173.3 |
| 4,460,311 A | 7/1984 | Trappmann et al. | |
| 4,596,116 A | 6/1986 | Mandet et al. | |
| 4,759,687 A | 7/1988 | Miraucourt et al. | |
| 4,863,345 A | 9/1989 | Thompson et al. | |
| 5,048,288 A | 9/1991 | Bessette et al. | |
| 5,074,748 A | 12/1991 | Hagle | |
| 5,080,557 A | 1/1992 | Berger | |
| 5,127,793 A | 7/1992 | Walker et al. | |
| 5,137,421 A | 8/1992 | Hayton | |
| 5,154,577 A | 10/1992 | Kellock et al. | |
| 5,169,287 A | 12/1992 | Proctor et al. | |
| 5,188,507 A | 2/1993 | Sweeney | |
| 5,197,853 A | 3/1993 | Creevy et al. | |
| 5,593,277 A | 1/1997 | Proctor et al. | |
| 5,639,210 A * | 6/1997 | Carpenter | F01D 11/18 415/135 |
| 5,655,876 A | 8/1997 | Rock et al. | |
| 5,780,146 A | 7/1998 | Mason et al. | |
| 5,964,575 A | 10/1999 | Marey | |
| 5,988,975 A | 11/1999 | Pizzi | |
| 6,113,349 A | 9/2000 | Bagepalli et al. | |
| 6,164,656 A | 12/2000 | Frost | |
| 6,290,459 B1 | 9/2001 | Correia | |
| 6,315,519 B1 | 11/2001 | Bagepalli et al. | |
| 6,340,285 B1 | 1/2002 | Gonyou et al. | |
| 6,402,466 B1 | 6/2002 | Burdgick et al. | |
| 6,412,149 B1 | 7/2002 | Overberg | |
| 6,503,051 B2 | 1/2003 | Predmore | |
| 6,503,574 B1 | 1/2003 | Skelly et al. | |
| 6,699,011 B2 | 3/2004 | Cot et al. | |
| 6,702,550 B2 | 3/2004 | Darkins, Jr. et al. | |
| 6,733,235 B2 | 5/2004 | Alford et al. | |
| 6,808,363 B2 | 10/2004 | Darkins, Jr. et al. | |
| 6,884,026 B2 | 4/2005 | Glynn et al. | |
| 6,887,528 B2 | 5/2005 | Lau et al. | |
| 6,893,214 B2 | 5/2005 | Alford et al. | |
| 6,942,203 B2 | 9/2005 | Schroder et al. | |
| 7,008,183 B2 * | 3/2006 | Sayegh | F01D 9/04 415/115 |
| 7,011,493 B2 | 3/2006 | Marchi et al. | |
| 7,052,235 B2 | 5/2006 | Alford et al. | |
| 7,217,089 B2 | 5/2007 | Durocher et al. | |
| 7,238,002 B2 | 7/2007 | Cairo et al. | |
| 7,270,518 B2 | 9/2007 | Barb et al. | |
| 7,278,820 B2 | 10/2007 | Keller | |
| 7,556,475 B2 | 7/2009 | Roberts, III et al. | |
| 7,563,071 B2 | 7/2009 | Campbell et al. | |
| 7,595,114 B2 | 9/2009 | Meschter et al. | |
| 7,686,577 B2 | 3/2010 | Morrison et al. | |
| 7,726,936 B2 | 6/2010 | Keller et al. | |
| 7,749,565 B2 | 7/2010 | Johnson et al. | |
| 7,753,643 B2 | 7/2010 | Gonzalez et al. | |
| 7,819,625 B2 | 10/2010 | Merrill et al. | |
| 7,871,244 B2 | 1/2011 | Marini et al. | |
| 7,908,867 B2 | 3/2011 | Keller et al. | |
| 7,950,234 B2 | 5/2011 | Radonovich et al. | |
| 7,968,217 B2 | 6/2011 | Sarrafi-Nour et al. | |
| 8,079,807 B2 | 12/2011 | Shapiro et al. | |
| 8,118,546 B2 | 2/2012 | Morrison | |
| 8,128,350 B2 | 3/2012 | Schiavo et al. | |
| 8,167,546 B2 | 5/2012 | Shi et al. | |
| 8,303,247 B2 | 11/2012 | Schlichting et al. | |
| 8,328,505 B2 | 12/2012 | Shi et al. | |
| 8,834,106 B2 | 9/2014 | Luczak | |
| 2002/0127108 A1 | 9/2002 | Crall et al. | |
| 2003/0031557 A1 | 2/2003 | Arilla et al. | |
| 2003/0202876 A1 | 10/2003 | Jasklowski et al. | |
| 2003/0215328 A1 | 11/2003 | McGrath et al. | |
| 2004/0005216 A1 | 1/2004 | Suzumura et al. | |
| 2004/0005452 A1 | 1/2004 | Dorfman et al. | |
| 2004/0047726 A1 | 3/2004 | Morrison | |
| 2004/0062640 A1 | 4/2004 | Darkins, Jr. et al. | |
| 2004/0219011 A1 | 11/2004 | Albers et al. | |
| 2005/0003172 A1 | 1/2005 | Wheeler et al. | |
| 2005/0111965 A1 | 5/2005 | Lowe et al. | |
| 2005/0129499 A1 | 6/2005 | Morris et al. | |
| 2005/0141989 A1 | 6/2005 | Sayegh et al. | |
| 2006/0078429 A1 | 4/2006 | Darkins, Jr. et al. | |
| 2006/0083607 A1 | 4/2006 | Synnott et al. | |
| 2006/0110247 A1 | 5/2006 | Nelson et al. | |
| 2006/0110248 A1 | 5/2006 | Nelson et al. | |
| 2006/0292001 A1 | 12/2006 | Keller et al. | |
| 2007/0031245 A1 | 2/2007 | Ruthemeyer et al. | |
| 2007/0154307 A1 | 7/2007 | Cairo | |
| 2008/0025838 A1 | 1/2008 | Marini et al. | |
| 2008/0206046 A1 | 8/2008 | Razzell et al. | |
| 2008/0206542 A1 | 8/2008 | Vance et al. | |
| 2009/0010755 A1 | 1/2009 | Keller et al. | |
| 2009/0053045 A1 | 2/2009 | Nowak et al. | |
| 2009/0053050 A1 | 2/2009 | Bruce et al. | |
| 2009/0208322 A1 | 8/2009 | McCaffrey | |
| 2009/0324393 A1 | 12/2009 | Gonzalez et al. | |
| 2011/0085899 A1 | 4/2011 | Foster et al. | |
| 2011/0182720 A1 | 7/2011 | Kojima et al. | |
| 2011/0274538 A1 | 11/2011 | Shi et al. | |
| 2011/0293410 A1 | 12/2011 | Marusko et al. | |
| 2011/0299976 A1 | 12/2011 | Uskert | |
| 2011/0318171 A1 | 12/2011 | Albers et al. | |
| 2012/0082540 A1 * | 4/2012 | Dziech | F01D 11/005 415/173.1 |
| 2012/0107122 A1 | 5/2012 | Albers et al. | |
| 2012/0156029 A1 | 6/2012 | Karafillis et al. | |
| 2012/0171023 A1 | 7/2012 | Albers et al. | |
| 2012/0247124 A1 | 10/2012 | Shapiro et al. | |
| 2012/0260670 A1 | 10/2012 | Foster et al. | |
| 2012/0263582 A1 | 10/2012 | Foster et al. | |
| 2012/0275898 A1 | 11/2012 | McCaffrey et al. | |
| 2013/0000324 A1 | 1/2013 | Alvanos et al. | |
| 2013/0004306 A1 | 1/2013 | Albers et al. | |
| 2013/0008176 A1 | 1/2013 | Shi et al. | |
| 2013/0011248 A1 | 1/2013 | Croteau et al. | |
| 2013/0017057 A1 | 1/2013 | Lagueux | |
| 2013/0266435 A1 | 10/2013 | Foster et al. | |
| 2014/0255170 A1 | 9/2014 | Hillier | |
| 2014/0271144 A1 | 9/2014 | Landwehr et al. | |
| 2014/0271145 A1 | 9/2014 | Thomas et al. | |
| 2014/0294571 A1 | 10/2014 | Hillier | |
| 2014/0294572 A1 | 10/2014 | Hillier et al. | |
| 2014/0308113 A1 | 10/2014 | Westphal et al. | |
| 2015/0016970 A1 | 1/2015 | Smith et al. | |
| 2015/0377035 A1 | 12/2015 | Freeman et al. | |
| 2016/0251982 A1 | 9/2016 | Shapiro | |
| 2017/0114670 A1 | 4/2017 | Shapiro et al. | |
| 2017/0130600 A1 | 5/2017 | Shapiro et al. | |
| 2017/0198607 A1 | 7/2017 | Shapiro et al. | |

FOREIGN PATENT DOCUMENTS

| | | |
|---|---|---|
| CN | 1458393 A | 11/2003 |
| CN | 1542259 A | 11/2004 |
| CN | 101372902 A | 2/2009 |
| CN | 102135020 A | 7/2011 |
| EP | 0770761 A1 | 5/1997 |
| EP | 1225309 A1 | 7/2002 |
| EP | 1548144 A1 | 6/2005 |
| EP | 1801361 A1 | 6/2007 |
| EP | 2631434 A2 | 8/2013 |
| EP | 2774905 A1 | 9/2014 |
| FR | 2540938 A1 | 8/1984 |
| FR | 2580033 A1 | 10/1986 |

(56) References Cited

FOREIGN PATENT DOCUMENTS

| | | |
|---|---|---|
| FR | 2942844 A1 | 9/2010 |
| GB | 2397102 A | 7/2004 |
| GB | 2484188 A | 4/2012 |
| GB | 2486964 A | 7/2012 |
| JP | 5365516 A | 6/1978 |
| JP | 5710710 A | 1/1982 |
| JP | 63239301 A | 10/1988 |
| JP | 04330302 A | 11/1992 |
| JP | 05141270 A | 6/1993 |
| JP | 0913904 A | 1/1997 |
| JP | 10103014 A | 4/1998 |
| JP | 2002276301 A | 9/2002 |
| JP | 2004036443 A | 2/2004 |
| JP | 2005155626 A | 6/2005 |
| JP | 2006105393 A | 4/2006 |
| JP | 2007046603 A | 2/2007 |
| JP | 2007182881 A1 | 7/2007 |
| JP | 2011080468 A | 4/2011 |
| JP | 2011247262 A | 12/2011 |
| JP | 2012097732 A | 5/2012 |
| JP | 2012140934 A | 7/2012 |
| JP | 2013015138 A | 1/2013 |
| JP | 2013170578 A | 9/2013 |
| WO | 02099254 A1 | 12/2002 |
| WO | 03026886 A2 | 4/2003 |
| WO | 2013163505 A1 | 10/2013 |
| WO | 2014130762 A1 | 8/2014 |

OTHER PUBLICATIONS

PCT Search Report and Written Opinion issued in connection with related PCT Application No. PCT/US2015/029236 dated Jul. 20, 2015.

PCT Search Report and Written Opinion issued in connection with related PCT Application No. PCT/US2015/029342 dated Jul. 22, 2015.

PCT Search Report and Written Opinion issued in connection with related PCT Application No. PCT/US2015/028050 dated Aug. 11, 2015.

European Search Report and opinion issued in connection with related EP Application No. 16155655.0 dated Aug. 1, 2016.

Chinese Office Action issued in connection with related CN Application No. 201610106090.1 dated Jan. 4, 2017.

Canadian Office Action issued in connection with related CA Application No. 2921269 dated Jan. 25, 2017.

Japanese Search Report issued in connection with related JP Application No. 2016029448 dated Jan. 25, 2017.

Japanese Office Action issued in connection with related JP Application No. 2016029448 dated Feb. 7, 2017.

Japanese Notice of Allowance issued in connection with related JP Application No. 2016513961 dated Feb. 21, 2017.

Non-Final Office Action issued in connection with Related U.S. Appl. No. 14/634,060 dated May 17, 017.

Unofficial English Translation of Chinese Office Action issued in connection with corresponding CN Application No. 201480028735.3 dated Sep. 5, 2016.

PCT Search Report and Written Opinion issued in connection with corresponding Application No. PCT/US2014/035089 dated Jul. 1, 2014.

U.S. Non-Final Office Action issued in connection with related U.S. Appl. No. 11/537,278 dated Jul. 9, 2009.

U.S. Final Office Action issued in connection with related U.S. Appl. No. 11/537,278 dated Jan. 27, 2010.

U.S. Non-Final Office Action issued in connection with related U.S. Appl. No. 13/327,349 dated Jul. 22, 2014.

U.S. Non-Final Office Action issued in connection with related U.S. Appl. No. 13/402,616 dated Jul. 24, 2014.

U.S. Non-Final Office Action issued in connection with related U.S. Appl. No. 13/327,349 dated Jan. 27, 2015.

PCT Search Report and Written Opinion issued in connection with related PCT Application No. PCT/US2014/068490 dated Mar. 5, 2015.

Chinese office action issued in connection with related CN Application No. 201210541477.1 dated May 12, 2015.

Chinese office action issued in connection with related CN Application No. 201310056712.0 dated Jun. 19, 2015.

European Search Report and opinion issued in connection with related EP Application No. 12195953.0 dated Jul. 22, 2015.

U.S. Final Office Action issued in connection with related U.S. Appl. No. 13/327,349 dated Aug. 6, 2015.

Japanese Office Action issued in connection with related JP Application No. 2012269895 dated Oct. 4, 2016.

Japanese Office Action issued in connection with related JP Application No. 2013027200 dated Oct. 18, 2016.

Chinese office action issued in connection with related CN Application No. 201480067368.8 dated Nov. 2, 2016.

Japanese Notice of Allowance issued in connection with related JP Application No. 2013027200 dated Nov. 29, 2016.

GE Related Case Form.

U.S. Appl. No. 62/011,237, filed Jun. 12, 2014.

* cited by examiner

CMC SHROUD SUPPORT SYSTEM OF A GAS TURBINE

CROSS-REFERENCE TO RELATED APPLICATIONS

This application is a national stage application under 35 U.S.C. § 371(c) of prior filed, co-pending PCT application serial number PCT/US2014/035089, filed on Apr. 23, 2014, which claims priority to U.S. Patent Application Ser. No. 61/824,491, titled "CMC Shroud Support System" filed May 17, 2013. The above-listed applications are herein incorporated by reference.

BACKGROUND

Embodiments of the invention relate to shrouds for a gas turbine engines. More particularly, but not by way of limitation, present embodiments relate to ceramic matrix composite shroud support systems utilized in gas turbine engines.

A typical gas turbine engine generally possesses a forward end and an aft end with its several core or propulsion components positioned axially therebetween. An air inlet or intake is located at a forward end of the engine. Moving toward the aft end, in order, the intake is followed by a compressor, a combustion chamber, and a turbine. It will be readily apparent from those skilled in the art that additional components may also be included in the engine, such as, for example, low-pressure and high-pressure compressors, and low-pressure and high-pressure turbines. This, however, is not an exhaustive list. An engine also typically has an internal shaft axially disposed along a center longitudinal axis of the engine. The internal shaft is connected to both the turbine and the air compressor, such that the turbine provides a rotational input to the air compressor to drive the compressor blades.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy.

Each of the turbines may include one or more stages of rotor blades which extend radially outward from rotor discs. A shroud assembly circumscribes the turbine rotor and defines an outer boundary for combustion gases flowing through the turbine. The turbine shroud may be a single unitary structure or may be formed of a plurality of segments. Some known shroud assemblies include a shroud hanger that is coupled to an outer casing of the engine to provide support to a plurality of shrouds positioned adjacent to, and radially outward of, the tips of the turbine blades. The shrouds may be coupled by way of a single bolted connection to the shroud hanger. However, should a crack or bolt failure occur, the shroud may become disconnected from the shroud hanger.

The shroud must be capable of meeting the design life requirements for use in the turbine engine operating temperature and pressure environment. To enable current materials to operate effectively in such strenuous temperature and pressure conditions, it has been practiced to utilize composite and, in particular, ceramic matrix composite (CMC) materials for use in the shroud segments because they have higher temperature capability than metallic type parts. However, such ceramic matrix composite (CMC) materials have mechanical properties that must be considered during the design and application of the CMC use as a shroud segment or component. CMC materials have relatively low tensile ductility or low strain to failure when compared to metallic materials. Also, CMC materials have a coefficient of thermal expansion which differs significantly from metal alloys used as restraining supports or hangers for shrouds of CMC type materials. Therefore, if a CMC shroud segment is restrained and cooled on one surface during operation, stress concentrations can develop leading to failure of the segment.

As may be seen by the foregoing, it would be desirable to overcome these and other deficiencies with gas turbine engine components. Moreover, it would be desirable to improve the reliability of a CMC shroud support system.

SUMMARY

According to embodiments of the invention, a shroud support system with load spreading comprises a shroud hanger which extends in at least a circumferential direction, the shroud hanger having a first wall and a second wall spaced apart in an axial direction by a retainer support wall, a ceramic matrix composite shroud disposed in the shroud hanger between the first and second walls and the retainer support wall, a retainer having circumferentially spaced first and second bolt holes, the retainer passing through the shroud, and first and second bolts passing through the shroud hanger and engaging the first and second bolt holes of the retainer. In another embodiment of the shroud support system, the shroud hanger has first and second bolt holes, the first and second bolt holes being spaced circumferentially. In another embodiment of the shroud support system, the first and second bolt holes of the shroud hanger extending one of parallel or at an angle relative to each other through the shroud hanger. In another embodiment, the shroud support system further comprises plural bosses depending from the retainer support wall. In another embodiment, the shroud support system further comprises a shroud hanger bolt hole in each boss. In another embodiment of the shroud support system, the shroud is disposed between first and second bosses. In another embodiment, the shroud support system further comprises air diffuser cavity holes in the shroud hanger. In another embodiment of the shroud support system, one of the first and second walls function as a spring. In another embodiment of the shroud support system, the retainer has a plurality of protrusions to engage the shroud. In another embodiment, the shroud support system further comprises a baffle disposed below the retainer and within the shroud hanger.

All of the above outlined features are to be understood as exemplary only and many more features and objectives of the embodiments of the present invention may be gleaned from the disclosure herein. Therefore, no limiting interpretation of this summary is to be understood without further reading of the entire specification, claims, and drawings included herewith.

BRIEF DESCRIPTION OF THE DRAWINGS

The above-mentioned and other features and advantages of these exemplary embodiments, and the manner of attaining them, will become more apparent and the shroud support system will be better understood by reference to the following description of embodiments taken in conjunction with the accompanying drawings, wherein.

DETAILED DESCRIPTION

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus, it is intended that the embodiments of the present invention cover such modifications and variations as come within the scope of the appended claims and their equivalents.

Referring to FIGS. 1-9, various embodiments of a Ceramic Matrix Composite ("CMC") shroud hanger support system are depicted. The shroud hanger support system may be utilized in various portions of the gas turbine engine including, but not limited to, high pressure and low pressure turbines as well as the compressor. The hanger support system includes a load spreading retainer and redundant couplings to retain the system together. All of these features improve any or all of manufacture, operation or performance.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the embodiments of the present invention, and do not create limitations, particularly as to the position, orientation, or use of the embodiments of the present invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Figure 1:
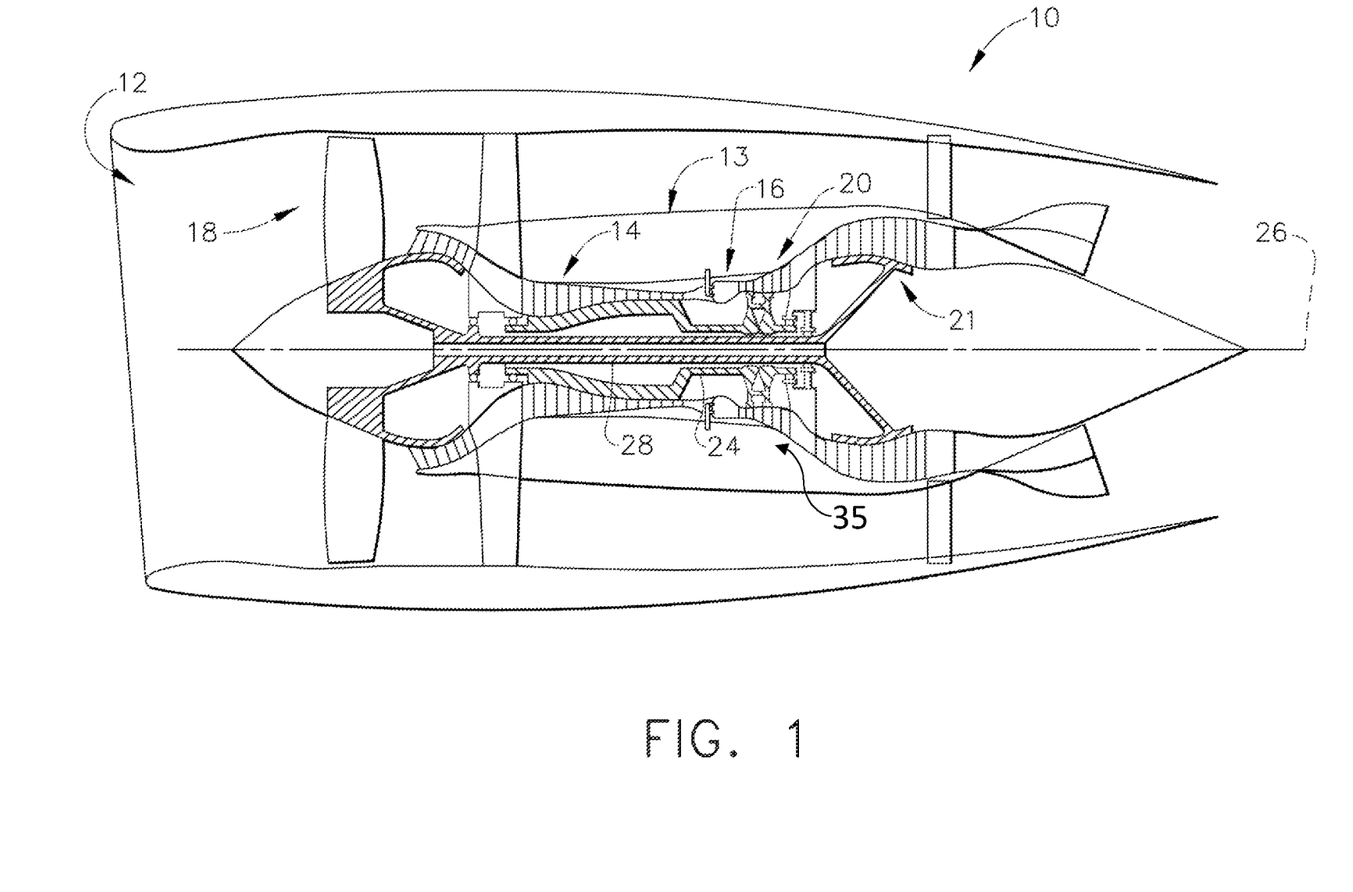
FIG. 1 is a side section view of a gas turbine engine.

Referring initially to FIG. 1, a schematic side section view of a gas turbine engine 10 is shown. The function of the turbine is to extract energy from high pressure and temperature combustion gases and convert the energy into mechanical energy for work. The gas turbine engine 10 has an engine inlet end 12 wherein air enters the core or propulsor 13 which is defined generally by a compressor 14, a combustor 16, and a multi-stage high pressure turbine 20. Collectively, the propulsor 13 provides during operation. The gas turbine engine 10 may be used for aviation, power generation, industrial, marine or the like.

In operation, air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. The low pressure turbine 21 may also be utilized to extract further energy and power additional compressor stages. The low pressure air may be used to aid in cooling components of the engine as well.

Figure 2:
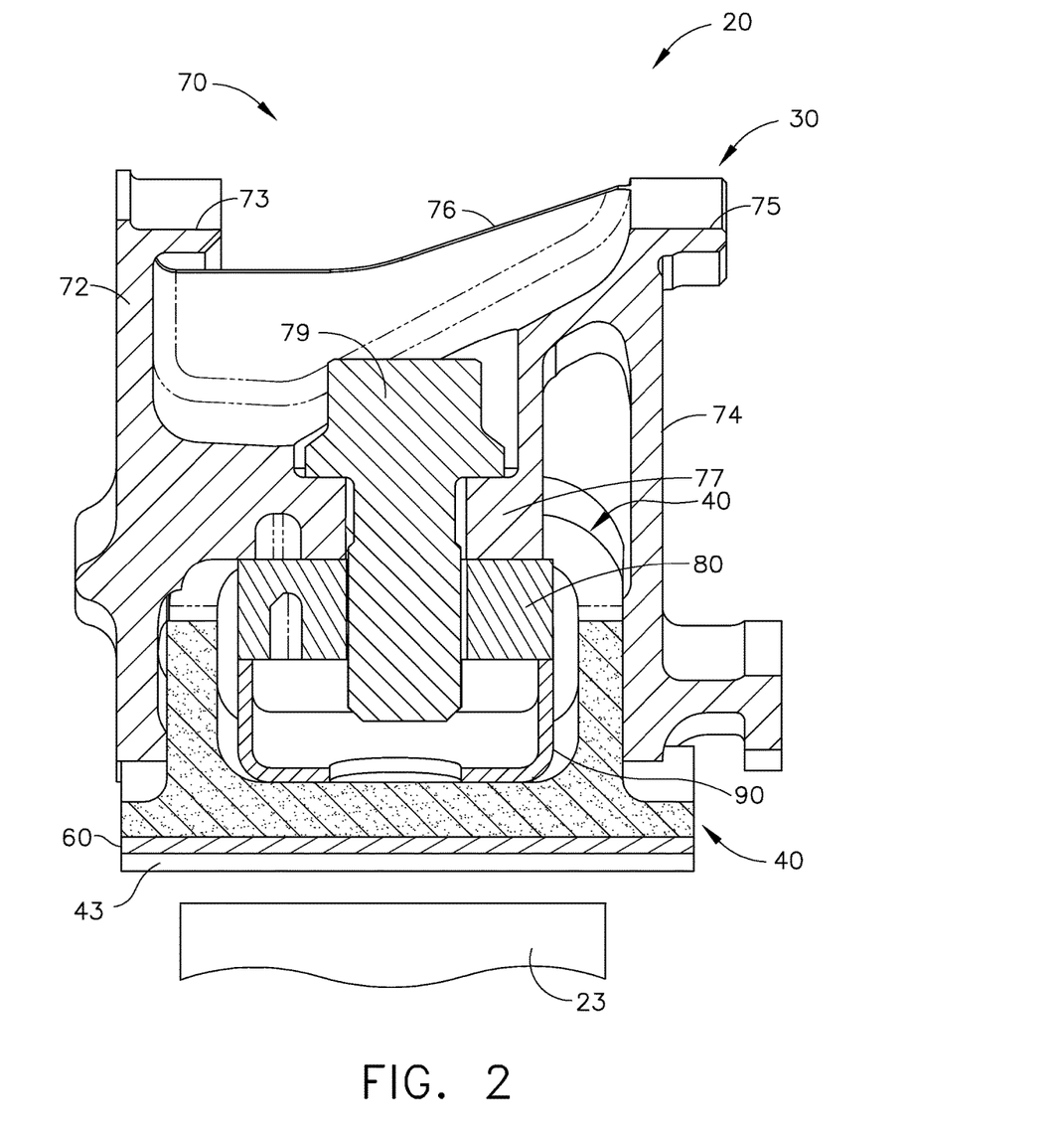
FIG. 2 is a side section view of an assembled exemplary turbine shroud support section system.
Figure 3:
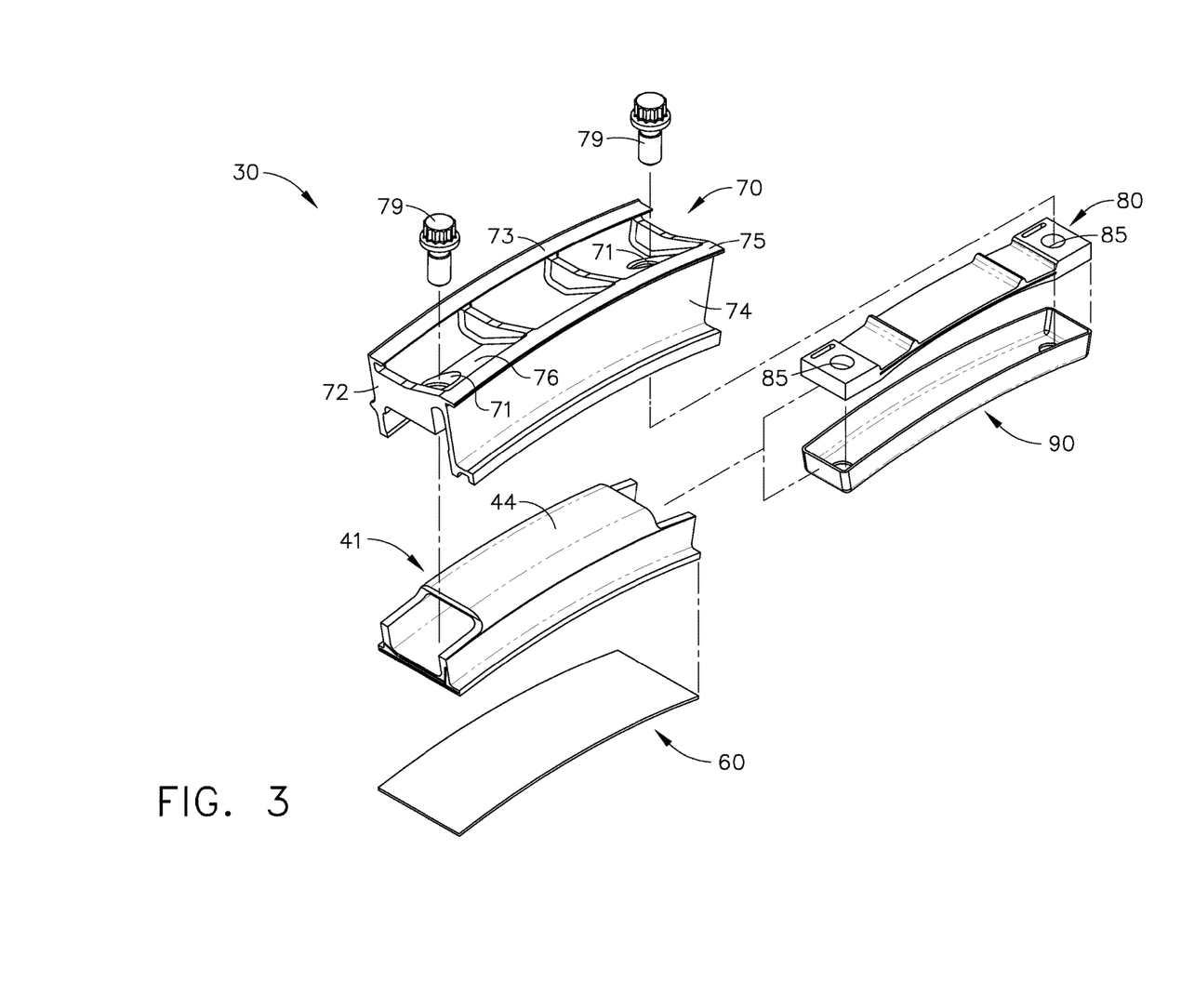
FIG. 3 is an exploded isometric view of an exemplary shroud support system.

Referring now to FIG. 2, a side section view of exemplary shroud support system 30 is depicted. An exemplary turbine is shown, however the instant embodiments are not limited to turbine use. The turbine 20 includes a row of circumferentially spaced stationary vanes (not shown) and a plurality of circumferentially spaced turbine blades 23 downstream of the vanes. The blades 23 are foil-shaped and mounted to a turbine rotor disk (not shown). Each of the blades 23 extends radially toward a shroud 40. The shroud 40 extends circumferentially about the engine axis 26 and is comprised of a plurality of shroud segments 41 (FIG. 3). Optionally, the shroud 40 may be formed of one unitary structure. The shroud 40 is tightly configured relative to the blades 23 so that the shroud 40 defines an outer radial flowpath boundary for the hot combustion gas flowing through the turbine 20.

The system 30 includes a hanger 70, a shroud 40 comprised of a plurality of shroud segments 41 and a retainer 80. A baffle 90 may optionally be used within the shroud segment 41 and beneath the retainer 80. The system 30 includes a shroud hanger 70 which is connected to an engine casing 35 and extends circumferentially about a portion of the engine, for example the turbine. The engine casing 35 extends circumferentially about the engine axis 26 (FIG. 1). Hangers 70 are extending from the radially inward side of the engine casing. The hangers 70 retain the shroud segments 41 in circular configuration about the engine axis 26 (FIG. 1) and the shroud segments 41 define the flow boundary within portions of the engine, for non-limiting example, the compressor 14 or turbine 20.

The shroud hanger 70 is defined by a plurality of segments which in combination, extend about the central axis 26 of the engine. The shroud hanger 70 includes a first wall 72 a second wall 74, each of which extend in a radial direction and in a circumferential direction. A hanger gusset 76 extends between the first wall 72 and the second wall 74 and may extend axially or may extend at an angle to the central axis 26 as depicted. According to instant embodiment, the gusset 76 is tapered from a lower radial height at the first wall 72 to a higher radial height at the second wall 74. The shroud hanger 70 includes tabs or hooks 73, 75 which may be utilized to engage the engine casing. The gusset 76 may alternatively be flat or tapered in the opposite direction. These hooks 73, 75 may take various forms in order to provide a mounting assembly or structure.

As depicted, the shroud hanger 70 has a space between the first wall 72 and the second wall 74 wherein the shroud segment 41 may be positioned. The lower most surface of the shroud segment 41 defines an outer surface of an air flow path within the gas turbine engine, for example a compressor or turbine. The segments 41 may further comprise an abradable material 43 on the lowermost surface. Radially inward from the shroud segment is an airfoil blade 23 which rotates during operation of the gas turbine engine 10 with a rotor disk.

A bolt 79 is positioned within the shroud hanger 70 and extends downwardly through a hanger boss 77. The bolt 79 is connected to the retainer 80 which extends in a circumferential direction through the shroud segment 41. The retainer 80 captures the shroud segment 41 within the shroud hanger 70 inhibiting the segment 41 from being removed from the shroud hanger 70. Each shroud hanger 70 includes two bosses 77 which are spaced apart circumferentially and are disposed near circumferential ends of the shroud segment 41. With the retainer 80 extending through the shroud segment 41, the shroud segment 41 is captured between the first and second walls 72, 74 and within the open space of the shroud hanger 70. Beneath the retainer 80 is a baffle 90 which aids with cooling of the shroud segments 41.

Referring now to FIG. 3, an exploded isometric assembly view of the shroud support system is depicted. In the exploded view, the shroud hanger 70 is shown with two bolts 79 depicted above the shroud hanger. The bolts 79 extend through the shroud hanger 70. The bolt passes through the apertures 71 in the hanger boss 77 (FIG. 2) and a retainer 80 passes through the shroud segment 41 so that bolt apertures 85 of the retainer 80 are aligned with the bolts 79 passing through the shroud hanger 70. With the retainer 80 extending through the shroud segment 41 and the bolts 79 extending through the hanger 70 into the apertures 85 of the retainer 80, the shroud segment 41 is pulled into a gap disposed between the first and second walls 72, 74 of the shroud hanger 70. The baffle 90 is disposed beneath the retainer 80 and is also positioned within the shroud segment 41 beneath the upper surface 44. Along a lower surface of the shroud segment 41, an abradable surface material 43 may be exposed so as to aid engagement with the blade 23 (FIG. 2).

Figure 4:
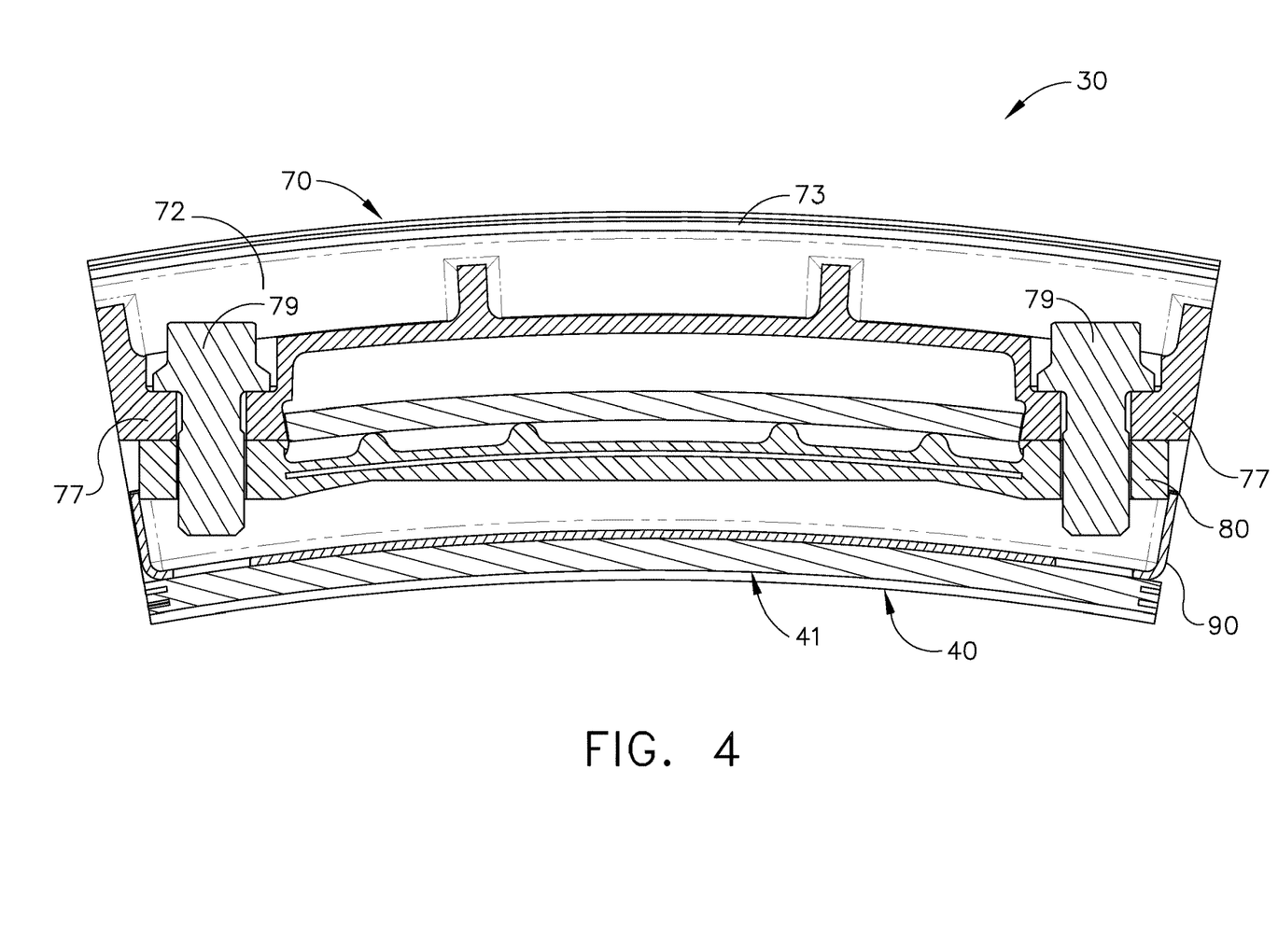
FIG. 4 is an aft-looking-forward section view of an exemplary shroud support system.

Referring now to FIG. 4, an assembled aft-looking forward section view of the support system 30 is depicted. The shroud hanger 70 includes a forward hook 73 in the first wall 72 depending downwardly from the hook 73. At the lower end of the first wall 72, at circumferential ends of the shroud hanger 70, are bosses 77. The bolts 79 extend downwardly through the boss 77 and into the retainer 80. The retainer 80 passes through the interior of the shroud segment 41 and therefore captures the shroud segment within the boundary of shroud hanger 70 and between the hanger boss structures 77. The shroud 41 has an upper surface which is sized with a circumferential dimension to fit between the circumferential dimensions separating the bosses 77. With this design, the shroud 41 need not have a center window as in prior art shrouds which alternate hanger systems use. This reduces stress concentrations in the shroud 41, and more specifically, the upper surface of the shroud 41. Additionally, the bolts 79 are parallel to one another to reduce bolt bending. This increases bolt durability and results in an improved joint. According to alternative embodiments however, the bolts 79 need not be parallel to be within the scope of the disclosed embodiments. For example, the bolts 79 may be biased at an angle relative to each other for ease of assembly.

Figure 5:
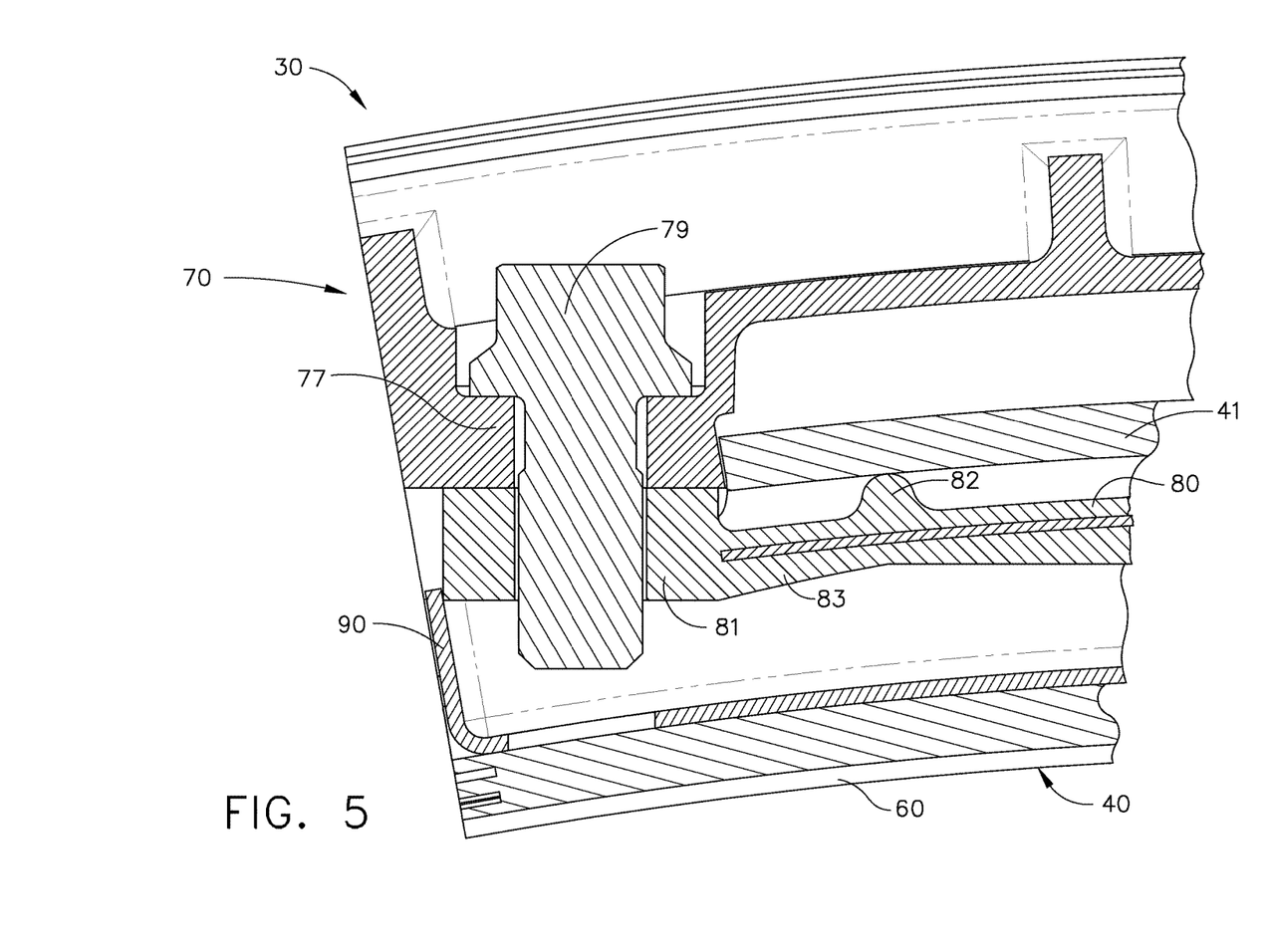
FIG. 5 is a detail section depicting one bolted connection of the shroud support system.

Referring now to FIG. 5, a detailed section view of the shroud hanger 70 is depicted. The detailed view shows a single boss 77 with a bolt 79 passing therethrough. A portion of the retainer 80 is shown connected by the bolt 79 to the shroud hanger 70. The retainer 80 includes a flange 81 and an arm 83 extending in a circumferential direction. The arm 83 includes a plurality of projections 82 which extend upwardly in the orientation depicted. The projections 82 engage the lower surface of the outer wall of shroud 41. This provides a determined loading location and spreads the load across the shroud 41 and arm 83 between the connections of the shroud hanger 70 and shroud 41.

Figure 6:
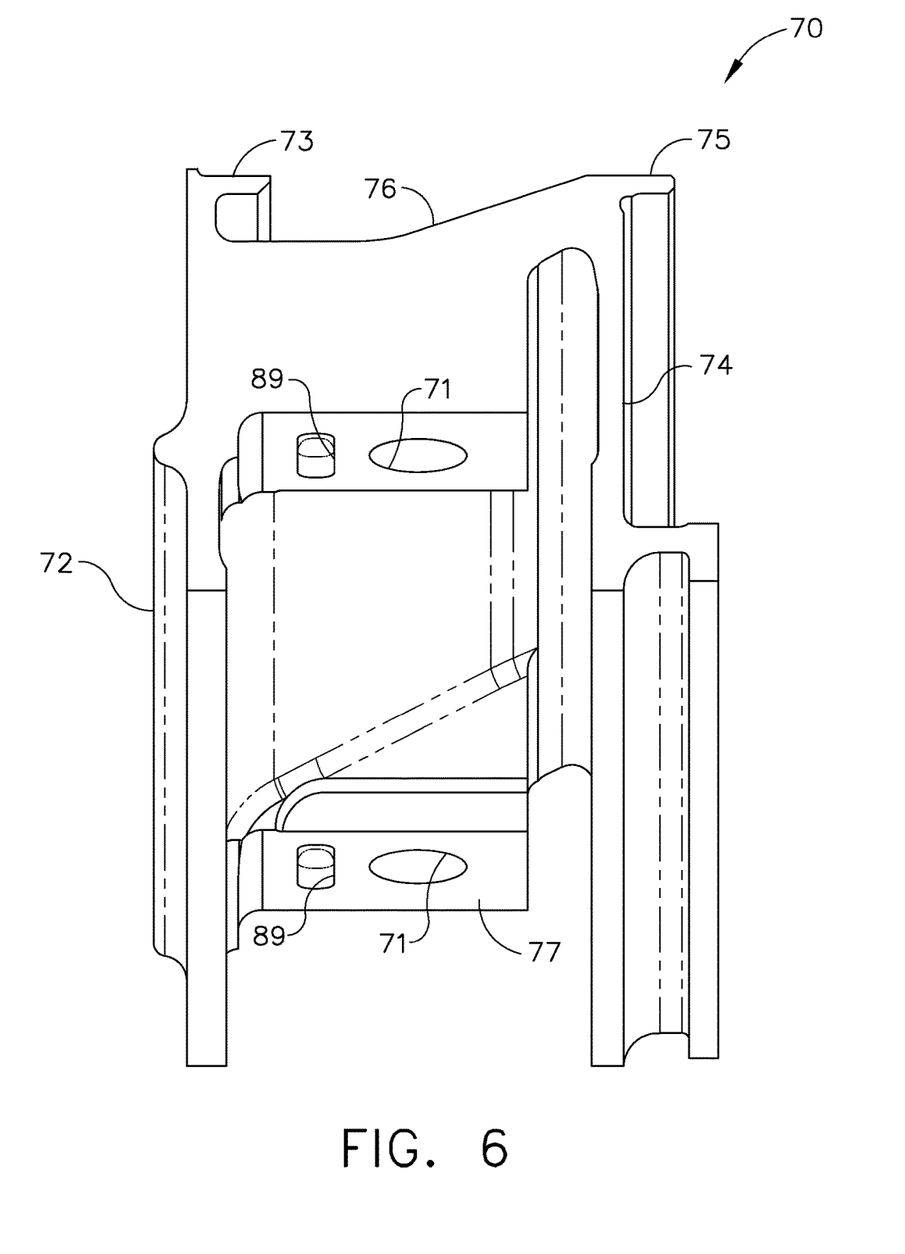
FIG. 6 is lower isometric view of a shroud hanger of the exemplary shroud support system.

Referring now to FIG. 6, a lower perspective view of a lower portion of the shroud hanger 70 is depicted. The shroud hanger segment 70 includes the first wall 72 and the opposite second wall 74. Extending between the first and second walls 72, 74 is the gusset or retainer support wall 76. At upper portions of the shroud hanger 70 are the hooks 73, 75 which may be utilized to connect the shroud hanger segment 70 to an engine casing. Although hooks are depicted, this is merely exemplary as various hanger structures may be utilized alternatively to the depicted hooks. The second wall 74 is spaced from the first wall 72 to receive a shroud segment 41 (FIG. 2) therebetween. Each of the bosses 77 includes bolt apertures 71. The bolt hole 71 receives a bolt 79 (FIG. 5) which passes through an upper side of the shroud hanger 70 extending downwardly through the shroud hanger. The lower most surfaces of the bosses 77 are horizontal and are abutted in the assembled structure by the retainer flanges 81 (FIG. 5) which have complimenting horizontal upper surfaces. These lower surfaces of the boss 77, however, may alternatively be angled so as to compliment a parallel surface of the retainer flange 81 and accordingly, carry a load across the lower surface of the boss 77.

Adjacent to the bolt holes 71 are air diffuser cavities 89. These holes provide shroud cooling air from a known source through the retainer baffle 90.

The second wall 74 of the shroud hanger 70 functions as a spring structure. When the shroud segment 41 (FIG. 7) is disposed between walls 72, 74, the wall 74 provides an axial force against the shroud segment 41 to positively locate the shroud segment within the shroud hanger 70. The bolt 79 retains radially and the walls 72, 74 retain the segment 41 axially.

Figure 7:
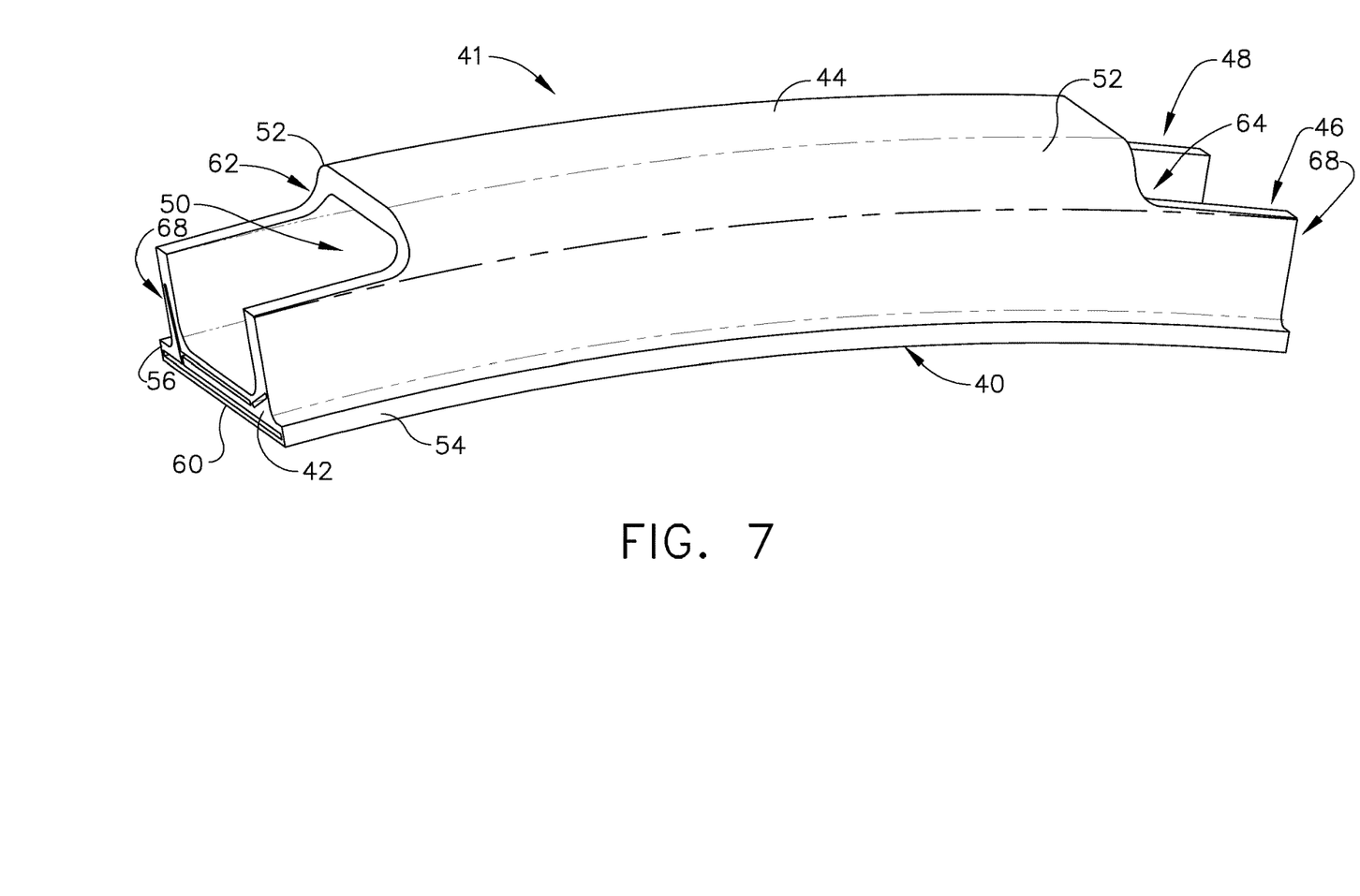
FIG. 7 is an isometric view of an exemplary shroud.

Referring now to FIG. 7, an isometric view of an exemplary shroud segment 41 is depicted. Each shroud segment 41 has a generally hollow cross-sectional shape defined by a radially inner wall 42 and a radially outer wall 44 and forward and aft walls 46, 48. Various cross-sectional shapes may be defined and the depicted shape should not be considered limiting. The wall 42, support walls 46, 48 define a hollow interior or cavity 50 through which air may pass for cooling of the shroud segments 41. A transition wall 52 may also be located between the forward wall 46 and the radially outer wall 44. The transition wall 52 may be curved as shown or at an acute angle to the longitudinal axis 26 of the engine 10. The walls 42, 44, 46, 48, 52 may be joined by radiused, sharp or squared-edged transitions between the intersections of the walls. As shown herein, the walls are generally radiused which may improve manufacture of the part.

The radially inner wall 42 extends beyond the forward wall 46 and aft wall 48 to define forward and aft overhangs 54, 56. When a plurality of shroud segments 40 are positioned together, a substantially continuous flow surface 60 is defined along the radially inner side of wall 42. This is best seen in a forward looking aft view of FIG. 5.

The shroud segments 41 include end faces 68 which are commonly referred to as "slash faces." The slash faces 68 may lie in plane parallel to the center line axis of the engine 10, referred to as a "radial plane", or they may be slightly offset from the radial plane, or otherwise oriented so that they are at an acute angle to such radial plane. Along the slash faces 68 are relief sections 62, 64, which in combination with adjacent relief sections of adjacent segments 41 form apertures. When a plurality of segments 41 are positioned to form a shroud or shroud assembly 40, the shroud 40 has a plurality of circumferentially spaced apertures formed by adjacent relief sections 62, 64 located at the slash faces 68. The shroud 40 is supported from the hanger 70 and retainer 80 at these locations.

When the segments 41 are assembled into a complete ring, end gaps may be present between the faces 68 at the adjacent shroud segments 41. One or more seals may be provided at the end faces 68. These seals are generally known as "spline" seals formed of thin strips of metal or other suitable materials which are inserted in slots in the end faces to span the gaps between adjacent segments 41.

The shroud segments 41 may be constructed of various low ductility and low coefficient of thermal expansion materials including but not limited to a ceramic matrix composite (CMC). Generally, CMC materials include a ceramic fiber, for example a silicon carbide (SiC), forms of which are coated with a compliant material such as boron nitride (BN). The fibers are coated in a ceramic type matrix, one form of which is silicon carbide (SiC). In an embodiment, the shroud segment 41 can also be constructed of other low-ductility, high-temperature-capable materials. CMC materials generally have room temperature tensile ductility of less than or equal to about 1% which is used herein to define a low tensile ductility material. Generally, CMC materials have a room temperature tensile ductility in the range of about 0.4% to about 0.7%.

CMC materials have a characteristic wherein the materials tensile strength in the direction parallel to the length of the fibers (the "fiber direction") is stronger than the tensile strength in the direction perpendicular. This perpendicular direction may include matrix, interlaminar, secondary or tertiary fiber directions. Various physical properties may also differ between the fiber and the matrix directions.

The shroud segment 41 may incorporate a layer of environmental barrier coating 43, which may be an abradable material, and/or a rub-tolerant material of a known type suitable for use with CMC materials. This layer is sometimes referred to as a "rub coat" 43. As used herein, the term "abradable" implies that the rub coat 43 is capable of being abraded, ground, or eroded away during contact with the tips of the turbine blades 23 as they turn inside the shroud segments 41 at high speed, with little or no resulting damage to the turbine blade tips. This abradable property may be a result of the material composition of the rub coat 43, by its physical configuration or by some combination thereof. The rub coat 43 may comprise a ceramic layer such as yttria stabilized zirconia or barium strontium aluminosilicate. Exemplary compositions and methods suitable for making the rub 43 are described in U.S. Pat. No. 7,749,565 (Johnson, et al.), which is incorporated herein by reference.

Figure 8:
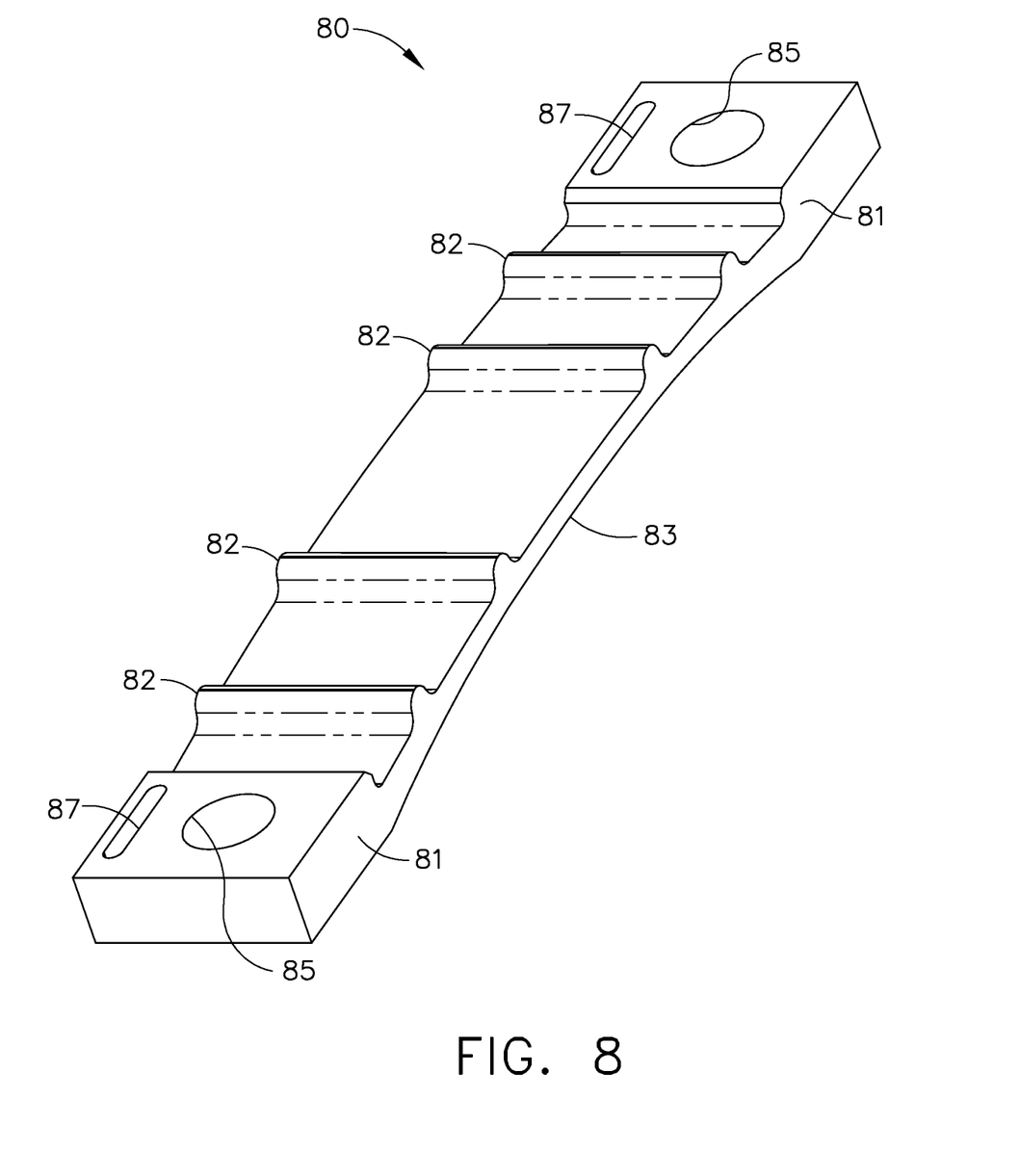
FIG. 8 is an isometric view of a retainer.

Referring now to FIG. 8, a perspective view of the retainer 80 is depicted. The retainer 80 includes flanges 81 at circumferential ends and an arm 83 extending between the opposed flanges. Each of the flanges 81 includes a bolt hole 85 which receives bolt 79 (FIG. 4). Additionally, the arm 83 includes a plurality of projections 82 which engage the shroud segment 41 to spread load across that structure and positively locate the load transfer through the shroud segment 41. The projections 82 are shown as rounded structures. However, alternate shapes may be utilized such that the projections engage the shroud 41. Additionally, the projections 82 extend in an axial direction of the engine and inhibit rocking of the shroud segments 41. Located along the flanges 81 are flow cavities 87 allowing air to pass through the shroud hanger 70 and through the retainer 80 to the baffle 90 beneath the retainer 80. The retainer 80 is positioned through the slash faces 68 at the relief sections 62, 64.

Figure 9:
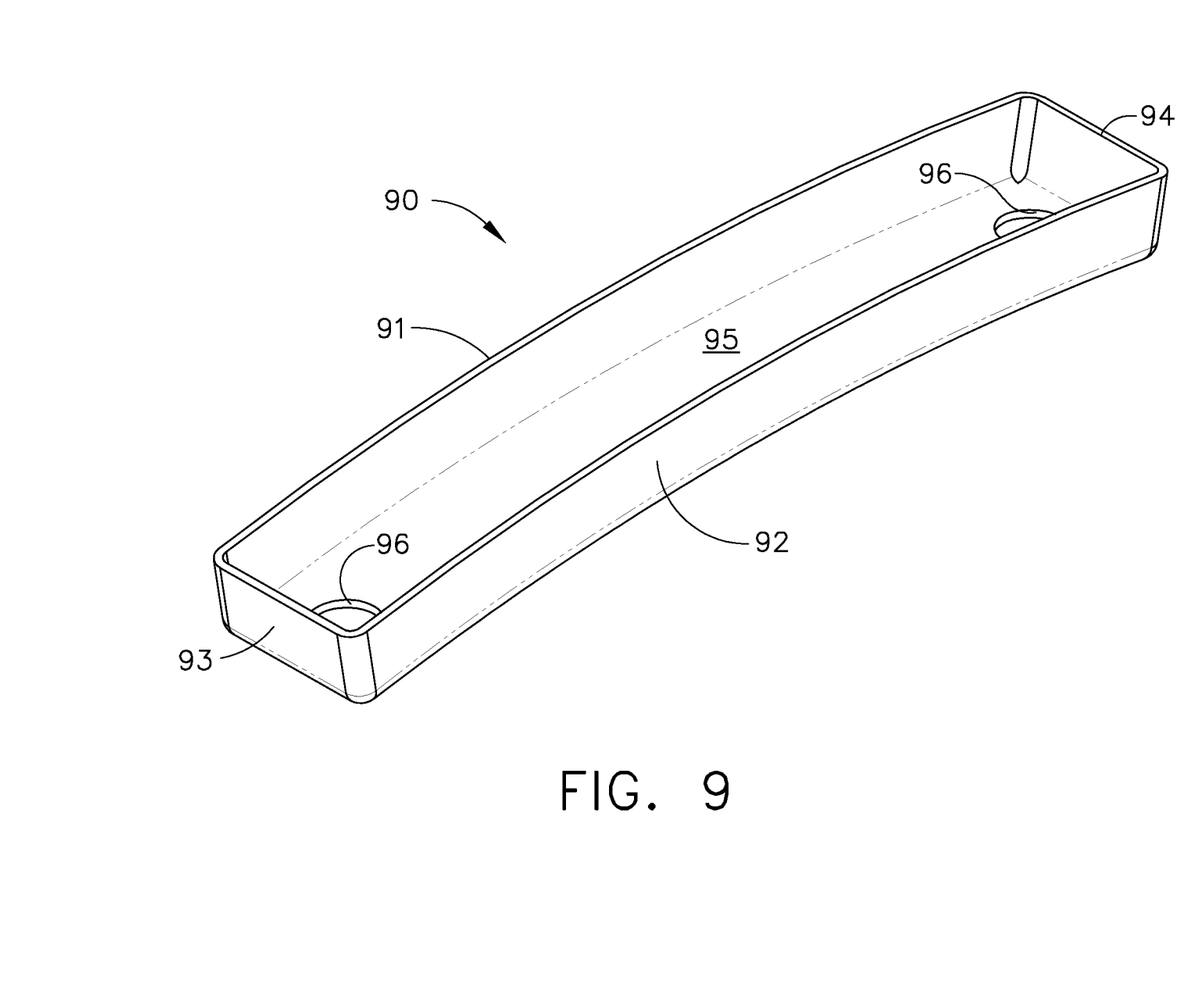
FIG. 9 is an isometric view of a baffle utilized with the shroud support system.

Referring now to FIG. 9, an upper perspective view of the baffle 90 is depicted. The baffle includes a lower surface 95 and a plurality of walls 91, 92, 93, 94. The lower surface of the baffle 95 includes first and second bolt holes 96 which receive the bolt 79 and provide for connection of the baffle to the remainder of the assembly of the support system 30. The baffle 90 provides backside impingement cooling to the shroud segment 41.

The foregoing description of structures and methods has been presented for purposes of illustration. It is not intended to be exhaustive or to limit the structures and methods to the precise forms and/or steps disclosed, and obviously many modifications and variations are possible in light of the above teaching. Features described herein may be combined in any combination. Steps of a method described herein may be performed in any sequence that is physically possible. It is understood that while certain forms of composite structures have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A shroud support system with load spreading, comprising:
   a shroud hanger which extends in at least a circumferential direction, said shroud hanger having a first wall and a second wall spaced apart in an axial direction by a retainer support wall and having a boss at each circumferential end;
   a ceramic matrix composite shroud, including a shroud segment disposed in said shroud hanger between said first and second walls and said retainer support wall, each shroud segment having a generally hollow cross-sectional shape defined by a radially inner wall, a radially outer wall, a forward wall, an aft wall, and opposing first and second circumferential ends, the first circumferential end having a first end face and the second circumferential end having a second end face, a first relief section formed in the radially outer wall at the first end face and a second relief section formed in the radially outer wall at the second end face, each of the first and second relief sections extending inwardly from respective end faces, removing a section of the radially outer wall between the forward wall and aft wall such that adjacent relief sections of adjacent segments form apertures and the radially outer wall between the first and second relief sections is sized with a circumferential dimension to fit between the circumferential dimensions separating the bosses;
   a retainer having circumferentially spaced first and second bolt holes, said retainer passing through an interior of said shroud segment; and
   first and second bolts passing through the bosses of said shroud hanger and through the first and second relief sections and engaging said first and second bolt holes of said retainer.

2. The shroud support system with load spreading of claim 1, said shroud hanger having first and second bolt holes, said first and second bolt holes being spaced circumferentially.

3. The shroud support system with load spreading of claim 2, said first and second bolt holes of said shroud hanger extending one of parallel or at an angle relative to each other through said shroud hanger.

4. The shroud support system with load spreading of claim 1 further comprising plural bosses depending from said retainer support wall.

5. The shroud support system with load spreading of claim 4 further comprising a shroud hanger bolt hole in each of said plural bosses.

6. The shroud support system with load spreading of claim 4, said shroud segment disposed between first and second bosses of said plural bosses.

7. The shroud support system with load spreading of claim 1 further comprising air diffuser cavity holes in said shroud hanger.

8. The shroud support system with load spreading of claim 1, one of said first and second walls functioning as a spring.

9. The shroud support system with load spreading of claim 1, said retainer having a plurality of projections to engage said shroud segment.

10. The shroud support system with load spreading of claim 1 further comprising a baffle disposed below said retainer and within said shroud hanger.

11. A gas turbine engine comprising:
    a turbine;
    an engine casing; and
    a shroud support system that extends circumferentially about at least a portion of the turbine, the shroud support system comprising:
       a shroud hanger connected to the engine casing and which extends in at least a circumferential direction, said shroud hanger having a first wall and a second wall spaced apart in an axial direction by a retainer support wall and having a boss at each circumferential end;
       a ceramic matrix composite shroud, including a shroud segment disposed in said shroud hanger between said first and second walls and said retainer support wall, each shroud segment having a generally hollow cross-sectional shape defined by a radially inner wall, a radially outer wall, a forward wall, an aft wall, and opposing first and second circumferential ends, the first circumferential end having a first end face and the second circumferential end having a second end face, a first relief section formed in the radially outer wall at the first end face and a second relief section formed in the radially outer wall at the second end face, each of the first and second relief sections extending inwardly from respective end faces to remove a section of the radially outer wall between the forward wall and aft wall such that adjacent relief sections of adjacent segments form apertures and the radially outer wall between the first and second relief sections is sized with a circumferential dimension to fit between the circumferential dimensions separating the bosses;

a retainer having circumferentially spaced first and second fastener holes, said retainer passing through an interior of said shroud segment; and first and second bolts passing through the bosses of said shroud hanger and through the first and second relief sections and engaging said first and second bolt holes of said retainer.

12. The gas turbine engine of claim 11, said shroud hanger having first and second bolt holes, said first and second bolt holes being spaced circumferentially.

13. The gas turbine engine of claim 12, said first and second bolt holes of said shroud hanger extending one of parallel or at an angle relative to each other through said shroud hanger.

14. The gas turbine engine of claim 11 further comprising plural bosses depending from said retainer support wall.

15. The gas turbine engine of claim 14 further comprising a shroud hanger bolt hole in each of said plural bosses.

16. The gas turbine engine of claim 14, said shroud segment disposed between first and second bosses of said plural bosses.

17. The gas turbine engine of claim 11 further comprising air diffuser cavity holes in said shroud hanger.

18. The gas turbine engine of claim 11, one of said first and second walls functioning as a spring.

19. The gas turbine engine of claim 11, said retainer having a plurality of projections to engage said shroud segment.

20. The gas turbine engine of claim 11 further comprising a baffle disposed below said retainer and within said shroud hanger.

* * * * *